(12) United States Patent
Hirai et al.

(10) Patent No.: US 8,279,171 B2
(45) Date of Patent: Oct. 2, 2012

(54) VOICE INPUT DEVICE

(75) Inventors: Takuya Hirai, Osaka (JP); Atsushi Yamashita, Osaka (JP); Tomohiro Terada, Osaka (JP)

(73) Assignee: Panasonic Corporation, Osaka (JP)

( * ) Notice: Subject to any disclaimer, the term of this patent is extended or adjusted under 35 U.S.C. 154(b) by 609 days.

(21) Appl. No.: 12/305,507

(22) PCT Filed: Jun. 28, 2007

(86) PCT No.: PCT/JP2007/062983
§ 371 (c)(1),
(2), (4) Date: Dec. 18, 2008

(87) PCT Pub. No.: WO2008/004486
PCT Pub. Date: Jan. 10, 2008

(65) Prior Publication Data
US 2010/0013760 A1    Jan. 21, 2010

(30) Foreign Application Priority Data
Jul. 6, 2006    (JP) ................................. 2006 186695

(51) Int. Cl.
G09G 5/00    (2006.01)
G10L 15/00    (2006.01)
(52) U.S. Cl. ....................................... 345/156; 704/275
(58) Field of Classification Search ............................ None
See application file for complete search history.

(56) References Cited

U.S. PATENT DOCUMENTS 5,890,122 A *  3/1999  Van Kleeck et al. .......... 704/275
6,529,875 B1 *  3/2003  Nakajima et al. ............. 704/275
6,718,308 B1 *  4/2004  Nolting .......................... 704/275
6,937,984 B1 *  8/2005  Morgan et al. ................ 704/270
6,993,486 B2 *  1/2006  Shimakawa ................... 704/275
(Continued)

FOREIGN PATENT DOCUMENTS

JP    08-076786    3/1996
(Continued)

OTHER PUBLICATIONS

International Search Report issued Sep. 25, 2007 in the International (PCT) Application of which the present application is the U.S. National Stage.

Primary Examiner — K. Wong
(74) Attorney, Agent, or Firm — Wenderoth Lind & Ponack, L.L.P.

(57) ABSTRACT

A voice input device, in which a content spoken by a user is reflected on a confirmation screen when executing the content, allows the user to confirm that a command, corresponding to the content which is spoken by the user who intended for the execution, is executed after being recognized by the voice input device. The voice input device includes a command storage section that stores a command in which one representative command name is associated with at least one paraphrased command name, a voice acquisition section that acquires voice spoken by a user, a command recognition section that refers to the command storage section and to recognize a paraphrased command name based on the voice acquired by the voice acquisition section, an execution section that executes a command corresponding to the paraphrased command name recognized by the command recognition section, and a display control section that displays the paraphrased command name recognized by the command recognition section when the execution section executes the command corresponding to the paraphrased command name.

9 Claims, 9 Drawing Sheets

U.S. PATENT DOCUMENTS

| | | |
|---|---|---|
| 7,085,722 B2 | 8/2006 | Luisi |
| 7,206,747 B1 * | 4/2007 | Morgan et al. ............... 704/275 |
| 7,233,904 B2 | 6/2007 | Luisi |
| 7,322,012 B2 * | 1/2008 | Ishii ............................ 715/811 |
| 7,426,467 B2 * | 9/2008 | Nashida et al. ............... 704/275 |
| 7,571,103 B2 * | 8/2009 | Mizuki et al. ................ 704/275 |
| 2002/0180804 A1 | 12/2002 | Ishii |
| 2006/0004743 A1 | 1/2006 | Murao et al. |

FOREIGN PATENT DOCUMENTS

| | | |
|---|---|---|
| JP | 10-222337 | 8/1998 |
| JP | 10-274996 | 10/1998 |
| JP | 2001-249685 | 9/2001 |
| JP | 2001-005491 | 10/2001 |
| JP | 2002-351921 | 12/2002 |
| JP | 2003-47768 | 2/2003 |
| JP | 2004-227089 | 12/2004 |
| JP | 2005-043461 | 2/2005 |
| JP | 2005-202198 | 7/2005 |
| JP | 2005-332319 | 10/2005 |
| JP | 2005-338274 | 12/2005 |
| JP | 2006-33795 | 2/2006 |

* cited by examiner

F I G. 2

| COMMAND NAME | COMMAND ID | NUMBER OF TIMES SPOKEN | REPRESENTATIVE TERM | TIME |
|---|---|---|---|---|
| A | 1 | 1 | 1 | 2006/3/6 12:34:56 |
| B | 1 | 0 | 0 | — |
| C | 1 | 0 | 0 | — |
| D | 1 | 2 | 0 | 2006/2/8 20:44:10 |
| E | 1 | 3 | 0 | 2006/3/21 11:11:11 |
| F | 2 | 1 | 1 | 2006/3/6 10:00:01 |
| . . . . | . . . . | . . . . | . . . . | . . . . |

PRIOR ART

VOICE INPUT DEVICE

BACKGROUND OF THE INVENTION

1. Technical Field

The present invention relates to a voice input device, and more particularly to a voice input device in which a content spoken by a user is reflected on a confirmation screen when executing the content, thereby allowing the user to confirm that a command, corresponding to the content which is spoken by the user who intended for the execution, is executed after being recognized by the voice input device.

2. Background Art

In a conventional voice input device, it is possible to execute, in one step, a content indicating a command name spoken by a user. In the case where such a voice input device is mounted on an in-vehicle device, it is extremely advantageous because any cumbersome manual operations are not required.

However, a command name assumed by the user is often different from a command name which is previously registered in the device. Therefore, if the user does not remember a command name, a content indicating the command name cannot be executed.

In view of the above, proposed is a device comprising a dictionary in which paraphrased command names are associated with a representative command name such that even if the user does not remember a command name, a content indicating the command name can be executed (see patent document 1, for example).

Note that the representative command name is a command name representatively used in an instruction manual. Also, the paraphrased command names are command names created by paraphrasing the representative command name in various forms.

For example, taking as an example a paraphrased command name which is used in practice in a car navigation system, "navigation termination" or "destination cancellation" is used, for example, as a paraphrased command name corresponding to a representative command name "route cancellation" indicating "finish the navigation to a destination".

[Patent document 1] Japanese Laid-Open Patent Publication No. 2005-202198

In the prior art, when the user speaks a paraphrased term, a content indicating a paraphrased command name corresponding to the paraphrased term is executed. When the content is executed, however, a representative command name associated with the paraphrased command name is displayed on a display screen as a content to be executed.

For example, as shown in FIG. 9, when the user says "traffic congestion avoidance route", a content corresponding to "traffic congestion avoidance route" is executed. However, a term to be displayed on the display screen is "traffic information reference route search". Therefore, the user mistakenly believes that rather than a content indicating the paraphrased term spoken by himself or herself, a content indicating a representative command name corresponding to the paraphrased term, is executed.

The present invention solves the above-mentioned problem. Specifically, an object of the present invention is to provide a voice input device in which a content spoken by a user is reflected on a confirmation screen when executing the content, thereby allowing the user to confirm that a command, corresponding to the content which is spoken by the user who intended for the execution, is executed after being recognized by the voice input device.

SUMMARY OF THE INVENTION

The present invention assumes a voice input device. The present invention comprises: a command storage section operable to store a command in which one representative command name is associated with at least one paraphrased command name; a voice acquisition section operable to acquire voice produced by a user; a command recognition section operable to refer to the command storage section and to recognize a paraphrased command name based on the voice acquired by the voice acquisition section; an execution section operable to execute a command corresponding to the paraphrased command name recognized by the command recognition section; and a display control section operable to display the paraphrased command name recognized by the command recognition section when the execution section executes the command corresponding to the paraphrased command name.

It is preferable that the display control section displays the paraphrased command name recognized by the command recognition section and the representative command name corresponding to the paraphrased command name so as to be distinguished from each other.

It is also preferable that the display control section displays, side by side, both of the paraphrased command name recognized by the command recognition section and the representative command name corresponding to the paraphrased command name in the form of a tree structure or in the form of a title.

It is also preferable that the voice input device further comprises a command history storage section operable to store a speech history of command names which have been previously recognized by the command recognition section, and the display control section determines any of the command names to be displayed based on the speech history stored in the command history storage section.

It is also preferable that the display control section determines, from the speech history stored in the command history storage section, to display one of the command names which has been most frequently spoken.

It is also preferable that the display control section determines, from the speech history stored in the command history storage section, to display one of the command names which has been most recently spoken.

It is also preferable that the display control section displays a GUI (Graphical User Interface) corresponding to any of the command names recognized by the command recognition section.

It is also preferable that the display control section highlights the GUI.

It is also preferable that the display control section displays a description of a function corresponding to the command name recognized by the command recognition section.

As described above, according to the present invention, it becomes possible to provide a voice input device in which a content spoken by a user is reflected on a confirmation screen when executing the content, thereby allowing the user to confirm that a command, corresponding to the content which is spoken by the user who intended for the execution, is executed after being recognized by the voice input device.

BRIEF DESCRIPTION OF THE DRAWINGS

FIG. 2 is a diagram illustrating an exemplary configuration of a command history storage section.

Figure 1:
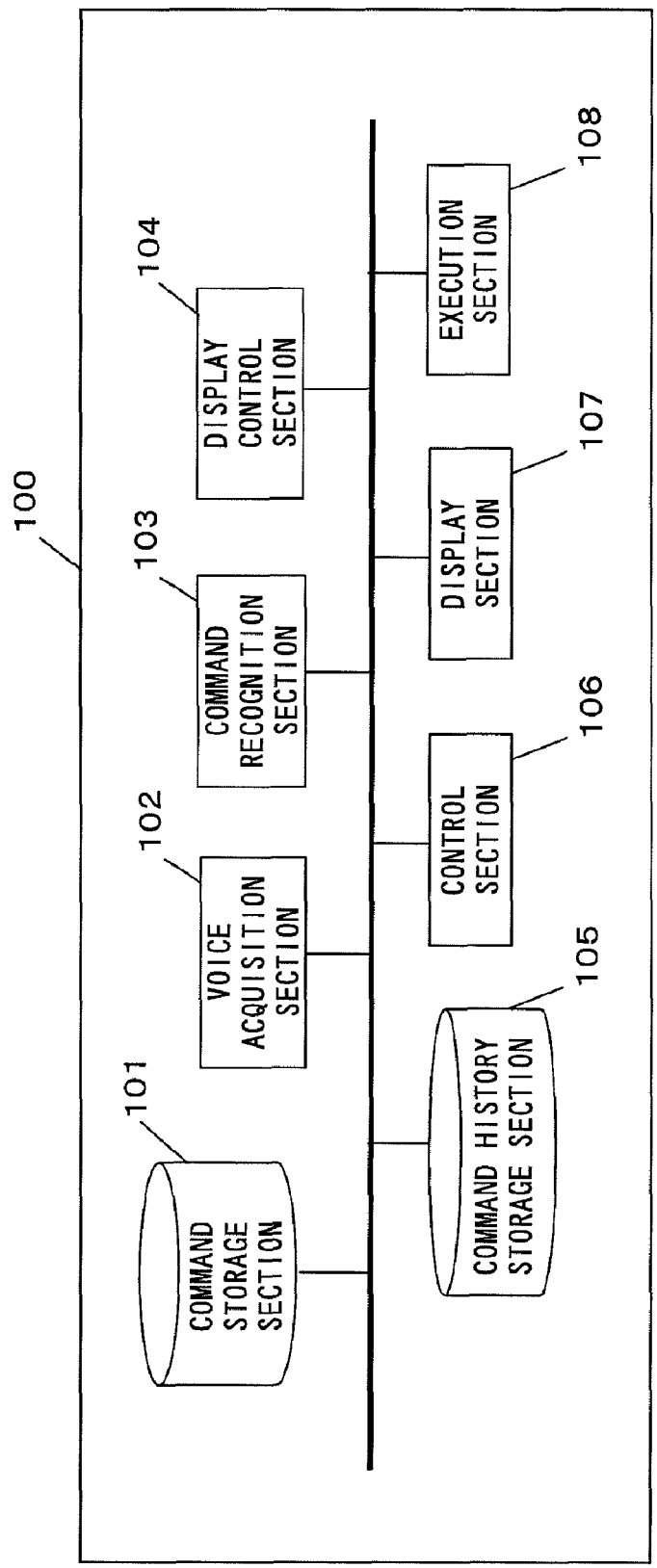
FIG. 1 is a block diagram illustrating an overall configuration of a voice input device according to an embodiment of the present invention.

DESCRIPTION OF THE REFERENCE CHARACTERS 100 voice input device
101 command storage section
102 voice acquisition section
103 command recognition section
104 display control section
105 command history storage section
106 control section
107 display section
108 execution section

DETAILED DESCRIPTION OF THE INVENTION

Hereinafter, a voice input device 100 according to an embodiment of the present invention will be described in detail with reference to the drawings. Note that the present embodiment assumes that the voice input device 100 according to the embodiment of the present invention is a device which is mounted on a car navigation system and which is able to execute various processing by means of voice input.

FIG. 1 is a block diagram illustrating an overall configuration of the voice input device 100 according to the embodiment of the present invention. In FIG. 1, the voice input device 100 comprises a command storage section 101, a voice acquisition section 102, a command recognition section 103, a display control section 104, a command history storage section 105, a control section 106, a display section 107, and an execution section 108.

The command storage section 101 is a ROM (Read Only Memory) or a RAM (Random Access Memory), for example, which stores each command in which one representative command name is associated with at least one paraphrased command name. For example, command names listed in a catalog are representative command names.

The voice acquisition section 102 acquires voice produced by a user. The voice acquisition section 102 compares the voice produced by the user with a voice pattern which is previously retained, thereby extracting a characteristic amount of a voice signal.

The command recognition section 103 refers to the command storage section 101, and recognizes a command name based on the voice acquired by the voice acquisition section 102. When any command name matching with the voice by a score higher than or equal to a predetermined reference value exists in the command storage section 101, the command recognition section 103 recognizes the voice as a command name.

In this case, the reference value indicates the degree of similarity between a voice characteristic of a command name stored in the command storage section 101 and a voice characteristic of a command name acquired by the voice acquisition section 102. For example, the degree of similarity is calculated by using a probability statistical model such as a Hidden Markov Model (HMM) or the like. When the reference value is satisfied, it is determined that a command name acquired by the voice acquisition section 102 exists in the command storage section 101.

The display control section 104 determines a display content to be displayed on the display section 107. The display section 107 is a display, for example, for displaying a display content determined by the display control section 104. The command history storage section 105 is a ROM or a RAM for storing a speech history of commands which have been previously spoken by the user. The command history storage section 105 is configured as shown in FIG. 2.

In FIG. 2, in a command name column, each command name corresponding to a value of a command ID column is indicated, and said each command name is associated with a command ID. Also, a representative term column indicates whether or not each command name corresponding to an ID of the command ID column is a representative term.

For example, a command name "A" corresponding to a command ID "1" of the command ID column is a representative term because a representative term column thereof indicates "1".

In the representative term columns of other command names "B", "C", "D" and "E", "0" is assigned, which indicates that these command names are paraphrased terms. Thus, for all command names, representative terms and paraphrased terms are distinguished from each other.

Next, the number-of-times-spoken column will be described. In this column, a value is updated each time the user speaks a corresponding command name to the voice input device. It is indicated that the command name "A" has been spoken once, the command name "D" has been spoken twice, the command name "E" has been spoken three times, and the command name "F" has been spoken once.

A time column indicates the most recent time at which each command was executed. For example, among commands corresponding to the command ID "1", the most recent execution time is "Mar. 21, 2006, 1100 hours, 11 minutes and 11 seconds" and a command name spoken at the execution time is the command name "E".

The control section 106 is a CPU, for example, for controlling an entirety of the voice input device 100. The execution section 108 executes a process corresponding to a command recognized by the command recognition section 103.

Figure 3:
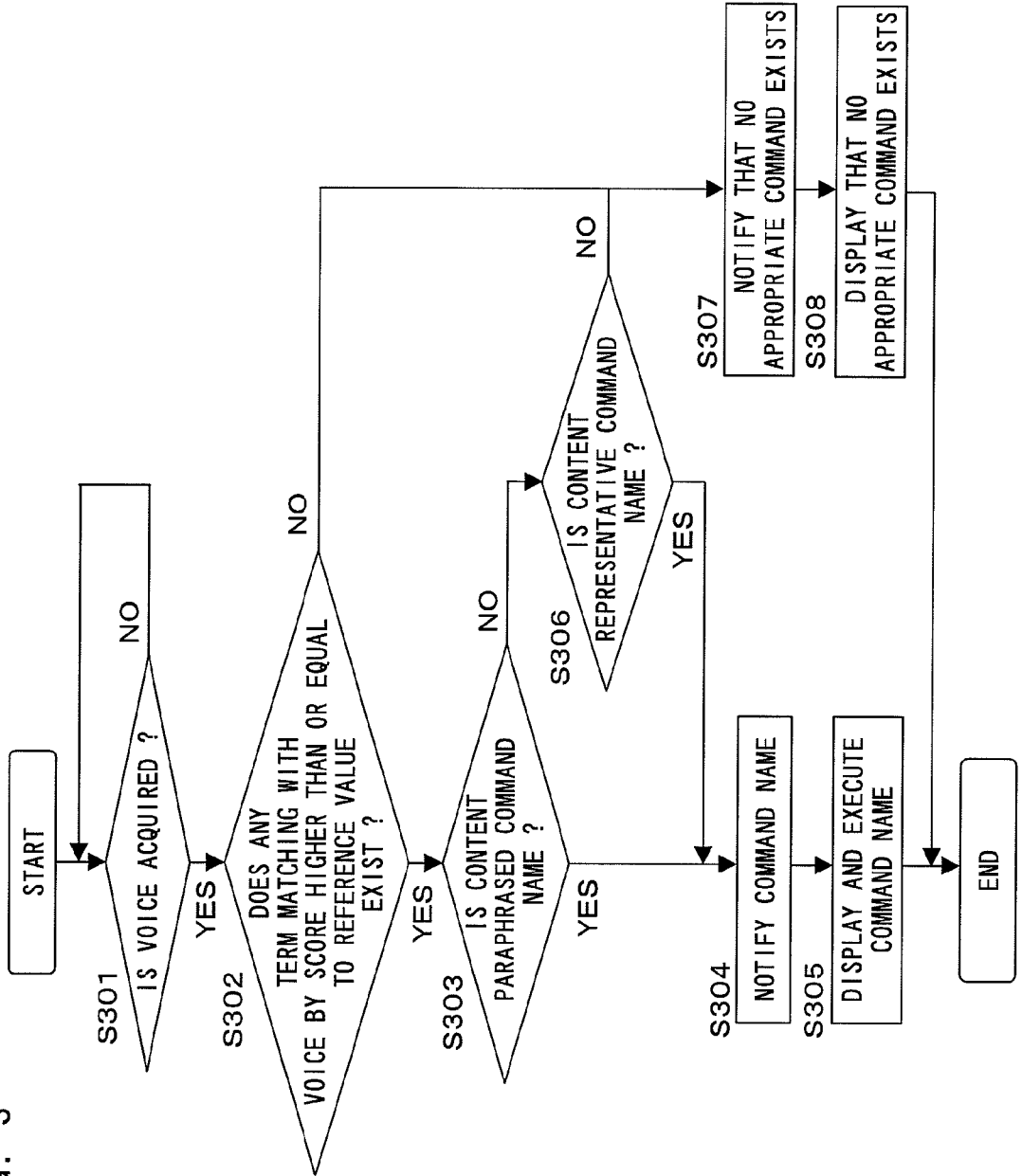
FIG. 3 is a flowchart illustrating an operation of the voice input device according to the embodiment of the present invention.

Hereinafter, an operation of the voice input device 100 according to the embodiment of the present invention will be described with reference to a flowchart shown in FIG. 3. Note that the present embodiment illustrates an example where a screen is switched from a map display screen to a menu display screen. The user inputs various commands by voice on the menu display screen, and executes processes corresponding to the various commands.

Firstly, the control section 106 determines whether or not the voice acquisition section 102 acquires a content spoken by the user (step S301).

In step S301, when it is determined that no command is acquired, the voice acquisition section 102 stands by until a command name is acquired.

On the other hand, in step S301, when it is determined that a command name "traffic congestion avoidance route" is acquired, the command recognition section 103 determines whether or not any term matching with the content acquired by the voice acquisition section 102 by a score higher than or equal to a predetermined reference value exists in the command storage section 101 (step S302).

In step S302, when it is determined that a term matching with the content by a score higher than or equal to the predetermined reference value exists, the command recognition section 103 recognizes the term as a command name. On the other hand, in step S302, when it is determined that no term matching with the content by a score higher than or equal to the predetermined reference value exists, the process proceeds to step S307 to be described below. Then, the control section 106 determines whether or not the command name recognized by the command recognition section 103 is a paraphrased command name (step S303).

In step S303, when it is determined that the command name is a paraphrased command name "traffic congestion avoidance route", the control section 106 notifies the display control section 104 of the paraphrased command name "traffic congestion avoidance route" recognized by the command recognition section 103. Furthermore, the control section 106 notifies the execution section 108 of a command ID associated with the paraphrased command name "traffic congestion avoidance route" (steps S303->S304).

Figure 4:
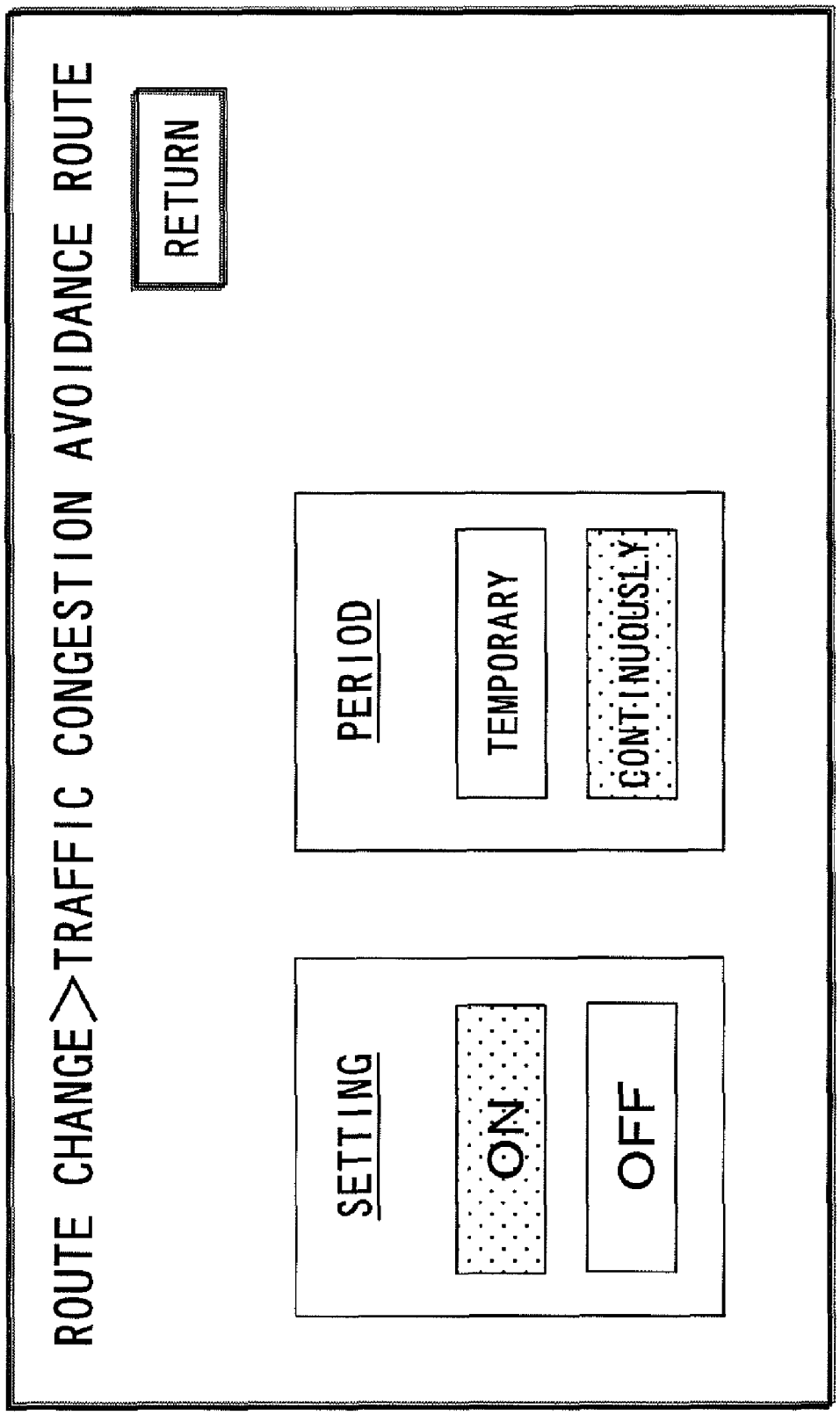
FIG. 4 is a view illustrating an exemplary display screen of the voice input device according to the embodiment of the present invention.

In step S304, when a paraphrased command name is notified, the display control section 104 displays the notified paraphrased command name "traffic congestion avoidance route" on the display section 107, as shown in FIG. 4. Furthermore, the execution section 108 executes a command process corresponding to the command ID having been notified (step S305).

Figure 5:
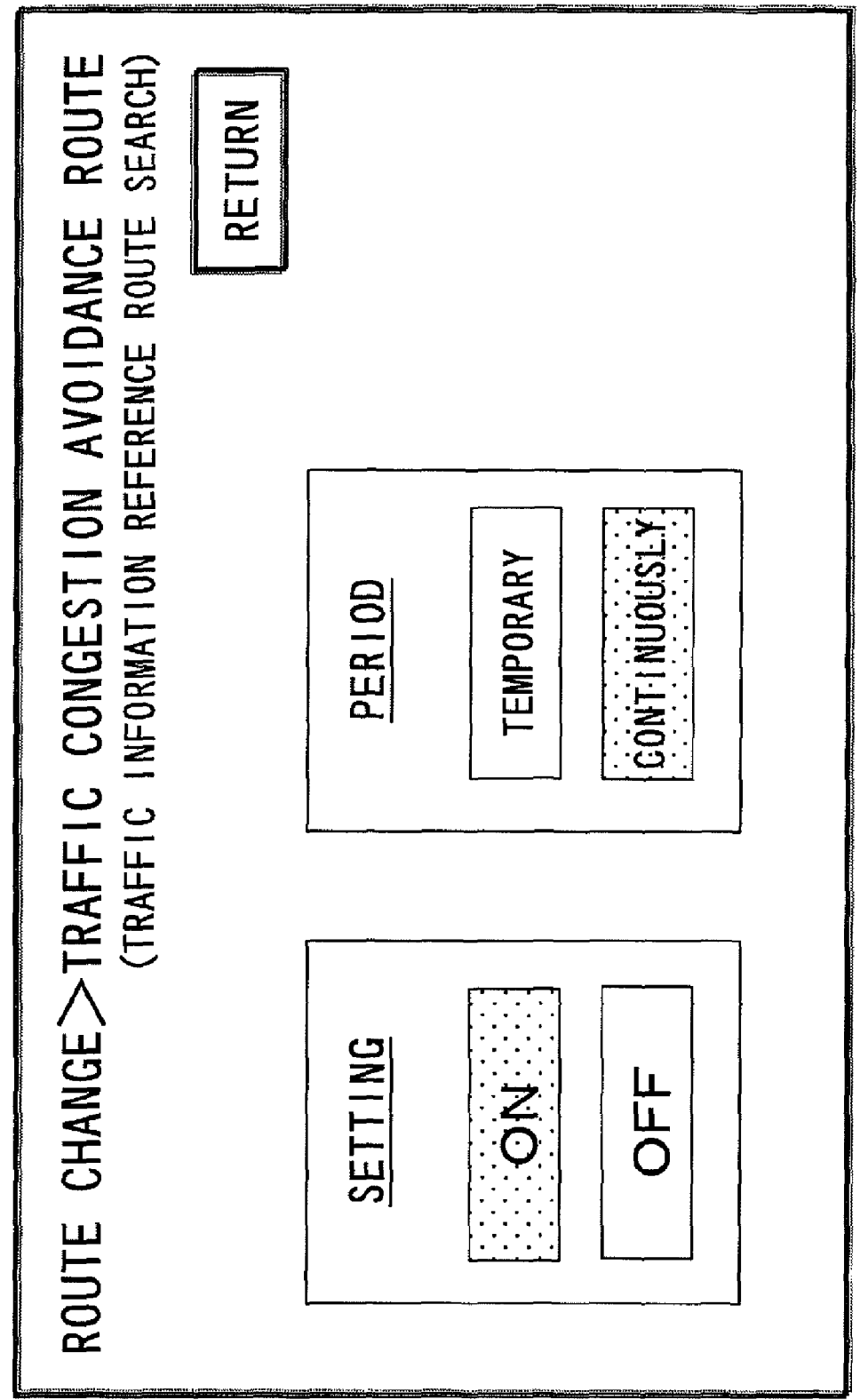
FIG. 5 is a view illustrating an exemplary display screen of the voice input device according to the embodiment of the present invention.

Note that as shown in FIG. 5, when the paraphrased command name "traffic congestion avoidance route" is displayed, a representative command name "traffic information reference route search" associated therewith may be displayed together with the paraphrased command name "traffic congestion avoidance route".

Furthermore, for example, it is assumed that a representative command name is in English and paraphrased command names are in Spanish. In this case, when a Spanish paraphrased command name is spoken, a command indicating an English representative command name is executed so as to display the Spanish paraphrased command name having been spoken. As such, a representative command name and paraphrased command names may be expressed in different languages. Still furthermore, an official name of an artist printed on the cover of a CD or the like may be expressed as a representative command name and an abbreviated name of the artist may be expressed as a paraphrased command name. For example, in the case where music in a CD or the like is reproduced by an audio player or the like, it is assumed that a representative command name is "the Rolling Stones" and a paraphrased command name is "Stones". In this case, when "Stones" as the paraphrased command name is spoken, a command indicating the representative command name "the Rolling Stones" is executed so as to display the paraphrased command name "Stones".

Furthermore, the paraphrased command name "traffic congestion avoidance route" and the representative command name "traffic information reference route search" may be displayed so as to be distinguished from each other. In this case, either of the representative command name or the paraphrased command name may be highlighted such as being displayed in parentheses, in bold type or underlined.

Furthermore, in the case where a command menu is tree-structured, a slave node "traffic congestion avoidance route" may be displayed in a hierarchy lower than a master node "route change". As shown in FIG. 5, for example, the command menu may be displayed in the form of a tree structure such that the command names "traffic congestion avoidance route" and "traffic information reference route search", both of which are used as slave nodes, are arranged side by side in a hierarchy lower than the master node "route change", by using a hierarchy symbol "<" between the mater and slave nodes. Alternatively, the command menu may be simply displayed in the form of a title such that the command name "traffic congestion avoidance route" and the command name "traffic information reference route search" are arranged side by side.

Figure 6:
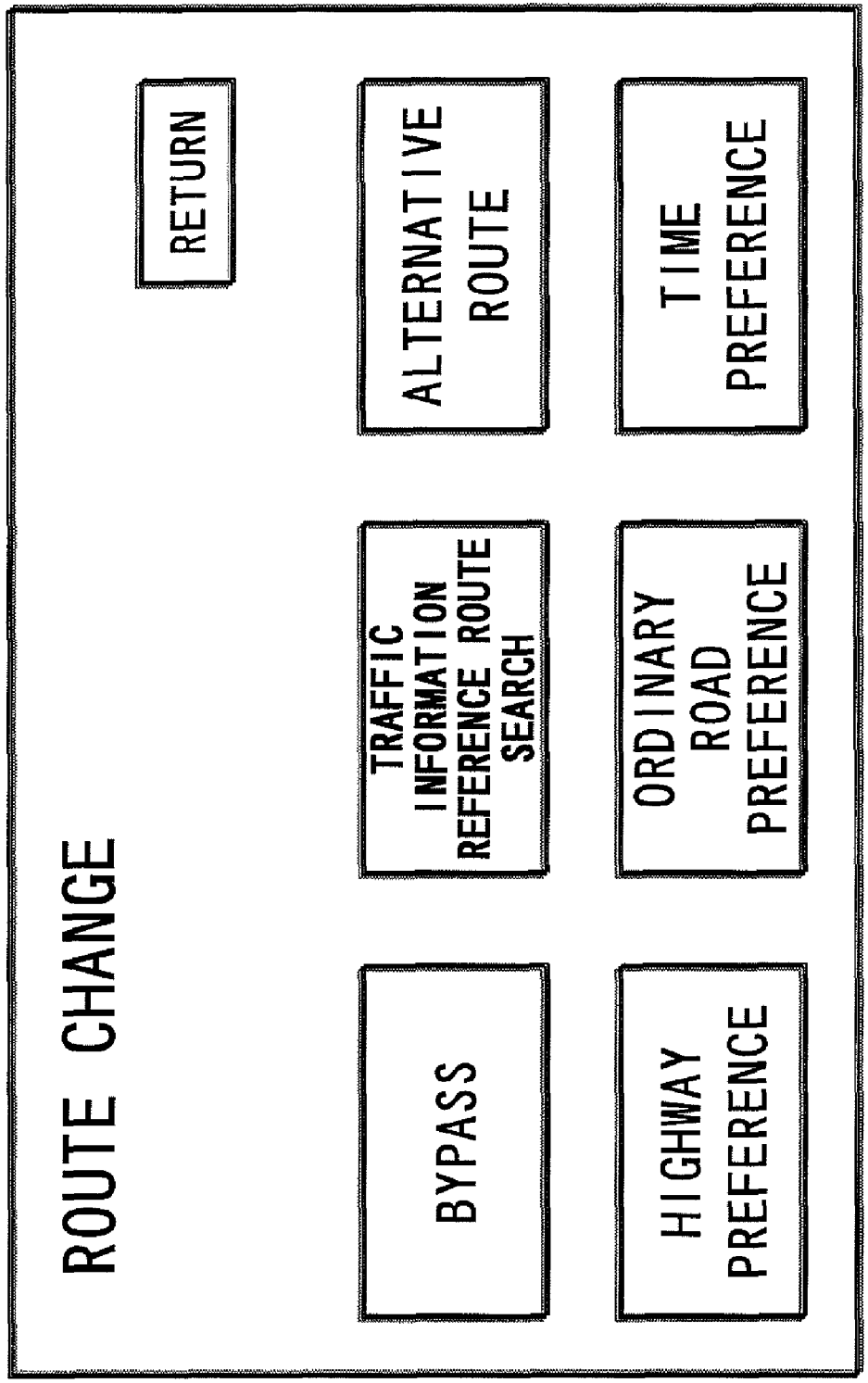
FIG. 6 is a view illustrating an exemplary display screen of the voice input device according to the embodiment of the present invention.
Figure 7:
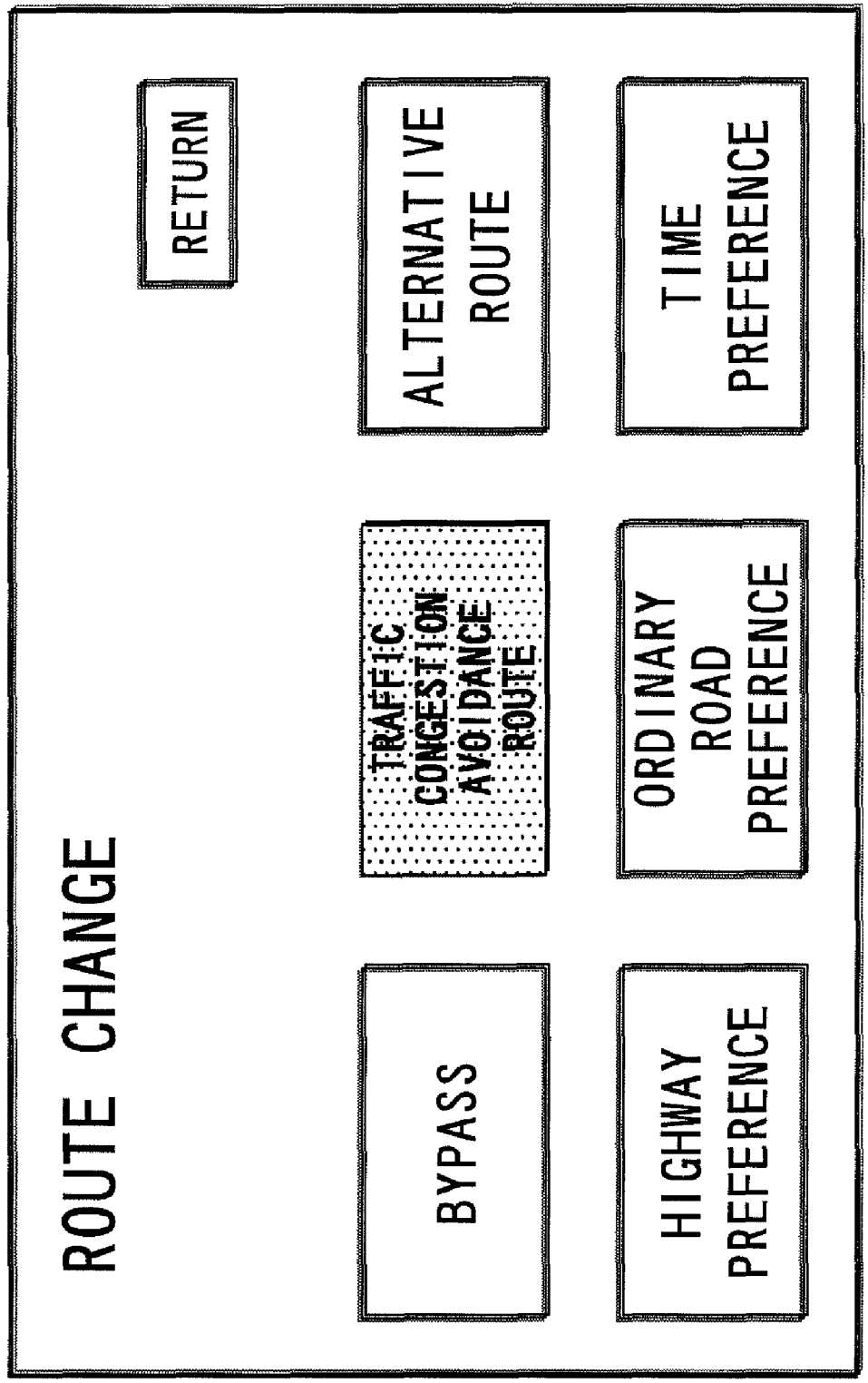
FIG. 7 is a view illustrating an exemplary display screen of the voice input device according to the embodiment of the present invention.

Note that any command names which have been previously spoken may be displayed based on the speech history stored in the command history storage section 105. For example, as shown in FIG. 6, slave nodes, which are "traffic information reference route search", "bypass", "alternative route", "highway preference", "ordinary road preference" and "time preference", are displayed in a hierarchy lower than the master node "route screen" on a default screen. This default screen may be changed, as shown in FIG. 7, such that different slave nodes obtained from the speech history, which are "traffic congestion avoidance route", "bypass", "alternative route", "highway preference", "ordinary road preference" and "time preference", are displayed in a hierarchy lower than the master node "route screen". In this case, the slave node "traffic information reference route search" is newly displayed, being replaced with "traffic congestion avoidance route" based on the speech history.

Alternatively, among these slave nodes, only a slave node which has been most frequently spoken may be displayed, or only a slave node which has been most recently spoken may be displayed.

Preferably, such slave nodes are displayed in GUIs represented by buttons or the like. In this case, each button corresponding to a command name spoken by the user may be highlighted by changing a display color thereof, or by changing a font (a color, size and/or thickness) of a character string.

Thus, a command name which has been most frequently spoken by the user is to be used as a representative command name for the user himself or herself. Therefore, a command name which has been repeatedly spoken by the user is displayed, thereby allowing the user to smoothly perform an operation when selecting a command.

Figure 8:
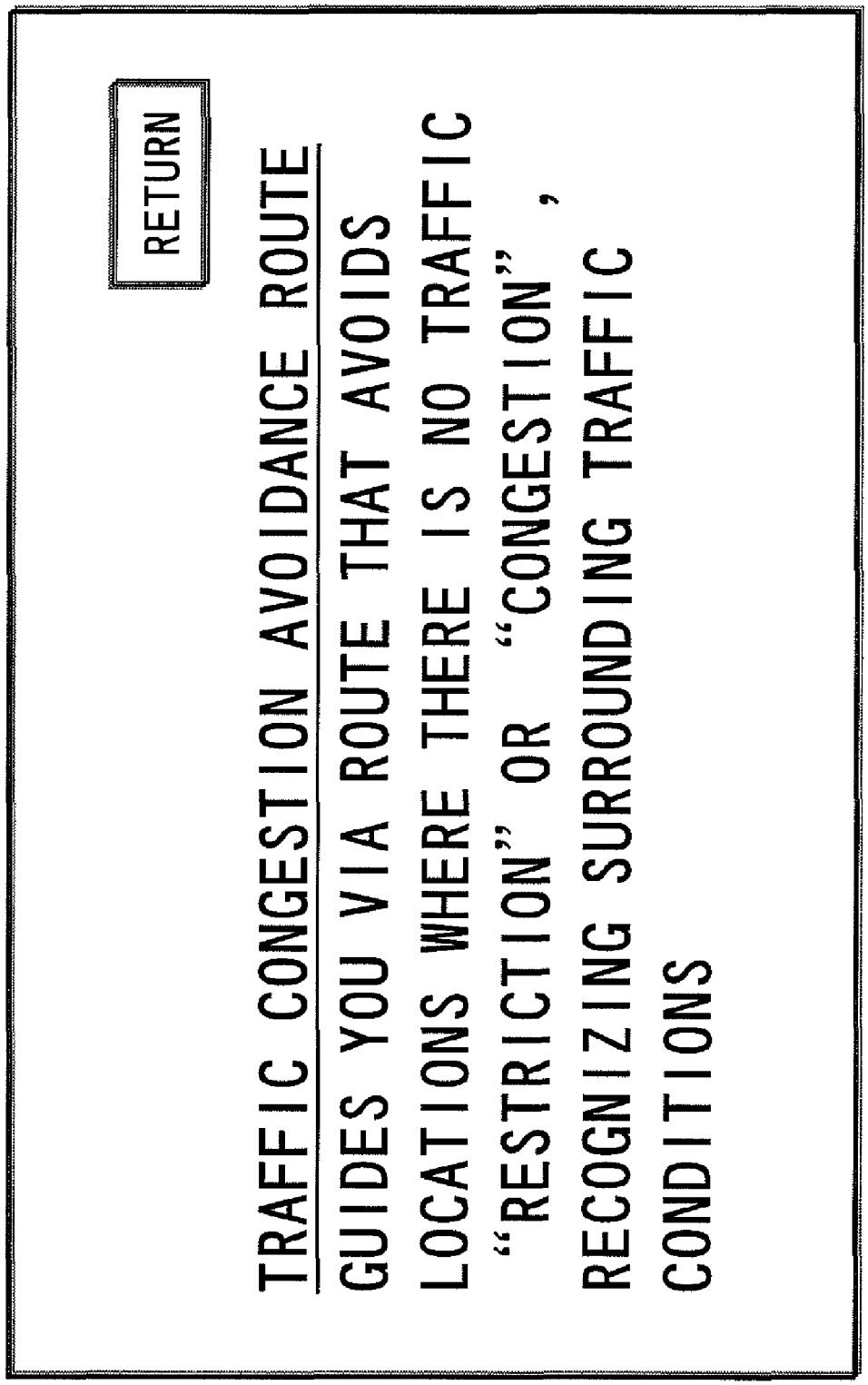
FIG. 8 is a view illustrating an exemplary screen describing a function.
Figure 9:
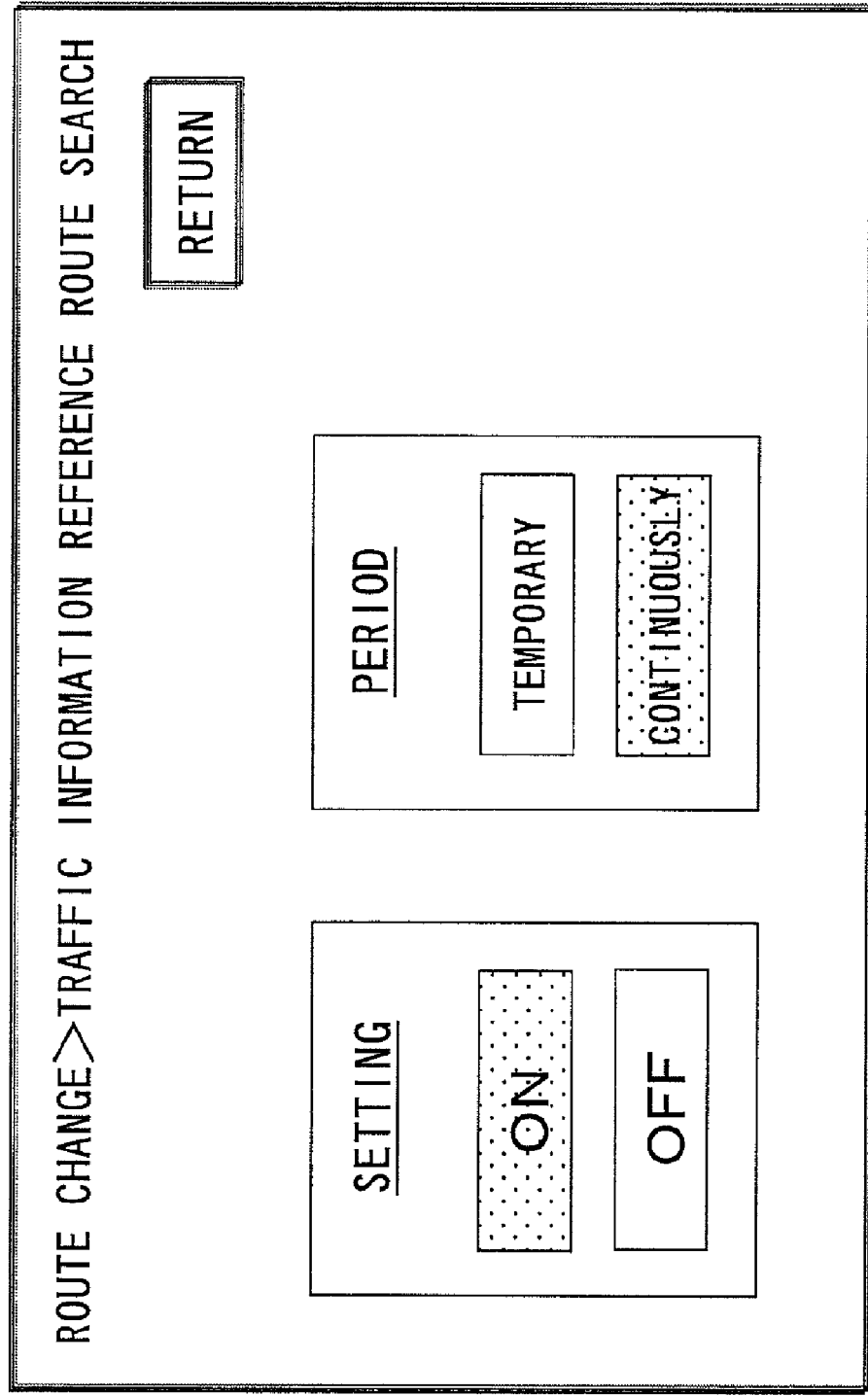
FIG. 9 is a view illustrating an exemplary display screen of a conventional voice input device.

Furthermore, FIG. 8 illustrates a help screen to be displayed when the user says "traffic congestion avoidance route" which is used as a paraphrased command name, instead of "traffic information reference route search" which is used a representative command name associated therewith. The user misunderstands a function of the command "traffic congestion avoidance route" if a function of the representative command "traffic information reference route search" associated therewith is described instead of "traffic congestion avoidance route". Therefore, the paraphrased command name spoken by the user is reflected in a column describing a function of a command which is usually indicated by the representative command name. Thus, the user can easily understand the function of the command.

Referring back to the flowchart, in step S303, when it is determined that the command name is not a paraphrased command name, the control section 106 determines whether or not the command name recognized by the command recognition section 103 is a representative command name (steps S303->S306).

In step S306, when it is determined that the command name is a representative command name, the control section 106 notifies the display control section 104 of the representative command name recognized by the command recognition section 103, and also notifies the execution section 108 of a command ID corresponding to the representative command name (steps S306->S304).

In step S304, when the representative command name is notified, the display control section 104 displays the notified representative command name on the display section 107. Furthermore, the execution section 108 executes a command process corresponding to the command ID having been notified (step S305).

On the other hand, in step S306, when it is determined that the command name is not a representative command name, the control section 106 notifies the execution section 108 and the display control section 104 that no appropriate command name exists in the command storage section 101 (step S307).

In step S307, when it is notified that no appropriate command name exists, the display control section 104 causes the display section 107 to display a message indicating that no appropriate command name exists. Also, the execution section 108 executes no process (step S308).

As described above, it becomes possible to provide a voice input device in which a content spoken by a user is reflected on a confirmation screen when executing the content, thereby allowing the user to confirm that a command, corresponding to a the content which is spoken by the user who intended for the execution, is executed after being recognized by the voice input device.

The configuration described in the above embodiment merely indicates a specific example and is not restrictive of the technical scope of the present invention. Any configuration can be employed within the scope of exerting the effect of the present invention.

The present invention is applicable to a voice input device mounted on a car navigation system or the like.

The invention claimed is:

1. A voice input device comprising:
  a command storage section operable to store a command in which one representative command name is associated with at least one paraphrased command name, the command storage section being a non-transitory memory device;
  a voice acquisition section operable to acquire a voice command produced by a user;
  a command recognition section operable to refer to the command storage section and to recognize a paraphrased command name based on the voice command acquired by the voice acquisition section;
  an execution section operable to execute a command corresponding to the paraphrased command name recognized by the command recognition section; and
  a display control section operable to change the representative command name to the paraphrased command name recognized by the command recognition section, and to display simultaneously both the paraphrased command name and the representative command name on a screen when the execution section executes the command corresponding to the paraphrased command name.

2. The voice input device according to claim 1, wherein the display control section displays the paraphrased command name and the representative command name corresponding to the paraphrased command name so as to be distinguished from each other.

3. The voice input device according to claim 1, wherein the display control section displays, side by side, both of the paraphrased command name and the representative command name corresponding to the paraphrased command name in the form of a tree structure or in the form of a title.

4. The voice input device according to claim 1, further comprising:
  a command history storage section operable to store a speech history of command names which have been previously recognized by the command recognition section, wherein
  the display control section determines any of the command names as the representative command name based on the speech history stored in the command history storage section.

5. The voice input device according to claim 4, wherein the display control section determines, from the speech history stored in the command history storage section, one of the command names which has been most frequently spoken as the representative command name.

6. The voice input device according to claim 4, wherein the display control section determines, from the speech history stored in the command history storage section, one of the command names which has been most recently spoken as the representative command name.

7. The voice input device according to claim 1, wherein the display control section displays a GUI (Graphical User Interface) corresponding to any of the command names recognized by the command recognition section.

8. The voice input device according to claim 7, wherein the display control section highlights the GUI.

9. The voice input device according to claim 1, wherein the display control section displays a description of a function corresponding to the command name recognized by the command recognition section.

* * * * *